C. F. ECKART.
PROCESS FOR ENHANCING THE GROWTH OF SUGAR CANE.
APPLICATION FILED NOV. 27, 1916.
1,227,898.
Patented May 29, 1917.
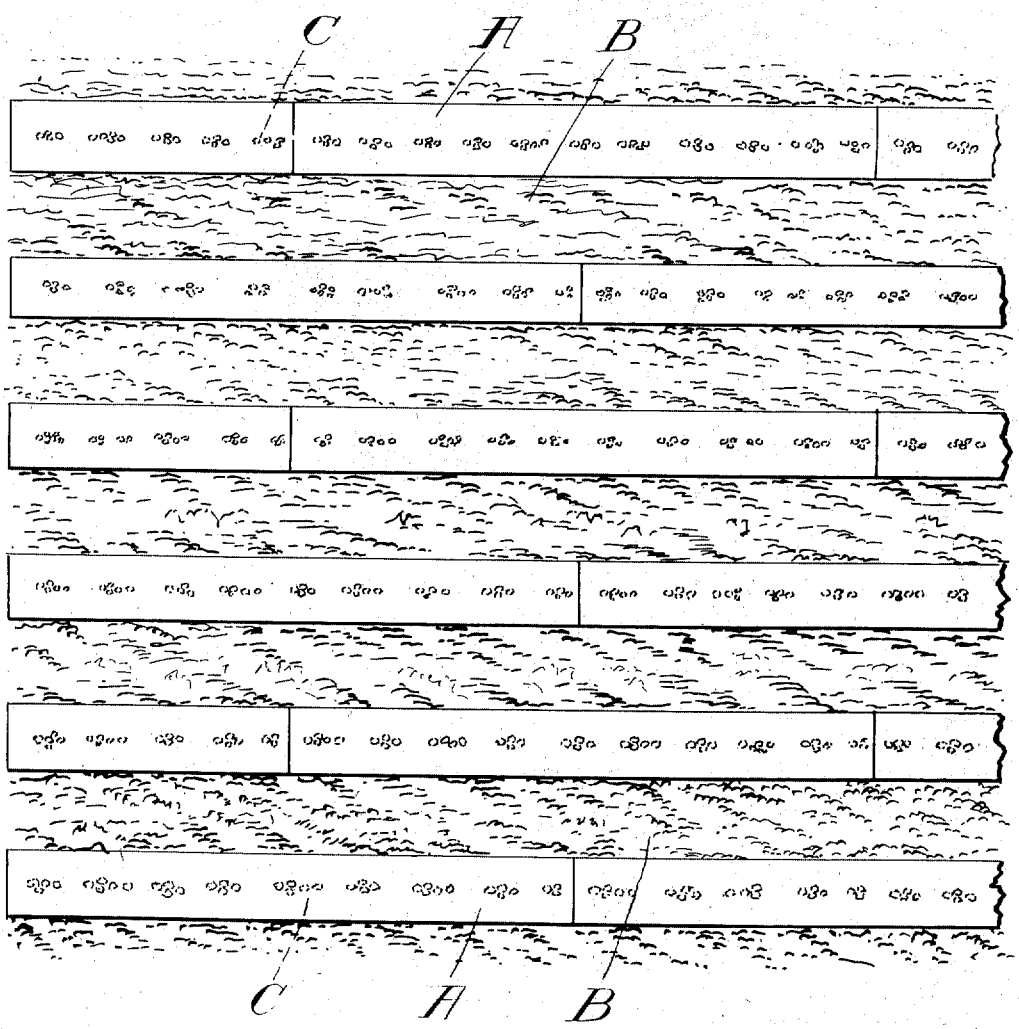

UNITED STATES PATENT OFFICE.

CHARLES FRANKLIN ECKART, OF OLAA, TERRITORY OF HAWAII.

PROCESS FOR ENHANCING THE GROWTH OF SUGAR-CANE.

1,227,898.  Specification of Letters Patent.  Patented May 29, 1917.

Application filed November 27, 1916. Serial No. 133,675.

*To all whom it may concern:*

Be it known that I, CHARLES FRANKLIN ECKART, a citizen of the United States, residing at Olaa, in the county and Territory of Hawaii, (whose post-office address is care of Olaa Sugar Co., Ltd., Olaa, Hawaii, Territory of Hawaii,) have invented certain new and useful Improvements in Processes for Enhancing the Growth of Sugar-Cane; and I do hereby declare the following to be a full, clear, and exact description of the invention, such as will enable others skilled in the art to which it appertains to make and use the same.

This invention relates to a process for enhancing the growth of sugar cane.

After sugar cane has been harvested the roots and the portions of the stalks which remain in the ground comprise what is known in the art as the stubble. If this stubble remains in the rows the following crop springs therefrom. While it is sometimes desirable to plow up the old stubble and plant the cane afresh, the stubble is permitted to remain in the ground ordinarily for a period of years. During this time voluntary crops periodically sprout from the stubble, which crops are termed "ratoons" or "ratoon cane". Thus, in Hawaii, where the stubble is plowed from the field once in about every eight years and where the crop matures in two years, usually about three "ratoon crops" are grown. In Cuba, however, the stubble is plowed from the field only once in about ten or twelve years and as the crop matures in practically one year, it will be readily seen that the majority of the cane produced are "ratoons." The shoots which spring from the stubble are at first spear-like in form and are exceedingly rigid. These shoots grow to some little height before the leaves begin to unfurl or expand so that during their initial growth they are, as above mentioned, spear-like and rigid and are practically free of protuberances.

It is an object of my invention to produce a process by means of which the "ratoon cane" will be permitted to grow unhampered by the presence of weeds in the cane rows. In carrying out this object I provide for the automatic selection of the cane so that it will be permitted to grow and so that the weeds which would naturally grow in the rows of stubble from a previous crop, will be prevented from growing.

In the drawing, the figure discloses diagrammatically the manner in which the process is carried out.

In carrying out the process the first step, after the previous crop has been harvested, is to "palepale" or rake the cane refuse or trash from the rows of stubble into the intervening spaces between the rows. Thus, those portions of the stubble which may extend above the ground are rendered free of trash as is also the earth between these portions. After the refuse has been raked from the rows in this manner, I apply a dressing of fertilizer over the rows and then place strips of paper or fabric longitudinally of the rows, superimposing them on the stubble or the over-lying soil. This paper or fabric may be either non-water-proof partially or wholly water-proof as the occasion requires. These strips may be either pegged or pinned to the ground or may be held in place by the refuse which is located between the rows, and some of which is permitted to rest on the outer edges of the strips. The strips may be of any convenient length so that they may be readily put in place. While I have described the application of fertilizer to the rows before the strips of paper or fabric are placed thereover, I contemplate the carrying out of the process, in some cases, without the application of the fertilizer, merely superimposing the strips upon the rows immediately after the trash has been raked therefrom. I have found by actual experiment that rosin sized paper meets the requirements where the process is carried out in a rainy district because of the fact that it is kept comparatively soft a great part of the time. I have also found that tar-felt may likewise be successfully used inasmuch as the heat of the sun will soften the impregnating substances. The successful carrying out of the process, however, does not depend upon the fact that the strip is of relatively soft material for the process may be carried out with the use of dry and comparatively harder or tougher material, because of the spear-like form and rigid nature of the shoots.

In the drawing, the stubble rows are indicated in dotted lines and are designated by the reference character C. Over these rows the covering strips A are superimposed, as previously described. Between the rows the cane refuse is deposited and is designated in the drawing by the character B.

When the shoots from the cane stubble sprout and come in contact with the covering material forming the strips they exert considerable mechanical pressure upon the strips, and in consequence of their spear-like form and their rigidity they puncture the strips and pass therethrough. This action on the strips is enhanced because of the fact that the strips are securely held to the ground. The weedy growth with its softer and more delicate stems and with its weaker terminal points is unable to puncture the fabric or the paper so as to pass through the same. Therefore, the cane shoots are permitted to pass through the strips and to grow while the weeds will be unable to pass therethrough, and consequently will be smothered and destroyed. Since the young cane shoots form the holes in the strips they will completely fill the holes so that it will be impossible for the weeds to also pass through these holes. No matter whether the rosin sized paper or the tar-felt or some other suitable paper is used for the strips, the cane shoots will penetrate the same because of their rigidity.

It will thus be obvious that the only portion of the field wherein the weeds may grow lies between the rows of cane. This portion, however, is covered by the trash or refuse as described and indicated in the drawing so that by the time the refuse rots and becomes incorporated with the soil, the cane will have attained such a growth that the weeds will be easily controlled by such economical means as spraying. Of course, it will be readily observed that the strips after being placed upon the rows will act as mulches and thus retain the moisture in the soil.

While I have described the process as applied to sugar cane, it is obvious that it might be equally well used in the growing of other crops in rows, which crops start from similar spear-like rigid shoots, and I do not wish to be limited to the use of the process alone in connection with sugar cane.

While I have described the process as being carried out in connection with the "ratoon crop," it is to be understood that it may be successfully carried out in connection with the cane which sprouts after the first planting, for the shoots of this cane are equally as spear-like and rigid as those which sprout from the stubble. The process may also be carried out after young or immature cane has been cut, as it ofttimes is, for agricultural or economic purposes.

From the foregoing description of the process, it will be seen that by the use of the same, sugar cane and such similar plants will be enabled to survive the useless and injurious weeds by permitting the former to grow and preventing the latter from growing.

What I claim is:

1. A process for enhancing the growth of sugar cane which consists in applying fertilizer to the rows of cane and superimposing a cover on the rows which is pervious to the cane and impervious to weeds.

2. A process for enhancing the growth of sugar cane which consists in applying fertilizer to the rows of cane, superimposing a cover on the rows which is pervious to the cane and impervious to weeds and attaching the cover to the ground.

3. A process for enhancing the growth of sugar cane which consists in superimposing a cover on the rows which cover is pervious to the cane and impervious to the weeds and securing the cover to the ground.

4. A process for enhancing the growth of sugar cane which consists in clearing the rows of trash, applying fertilizer to the rows, and superimposing a cover on the rows which cover is pervious to the cane and impervious to the weeds.

5. A process for enhancing the growth of sugar cane which consists in clearing the rows of trash, depositing the trash between the rows and superimposing a cover on the rows which cover is pervious to the cane and impervious to the weeds.

6. A process for enhancing the growth of sugar cane which consists in preventing and arresting the growth of weeds and permitting the continuous growth of the cane by placing a cover on the rows which is pervious to the cane and impervious to the weeds.

In testimony whereof I affix my signature.

CHARLES FRANKLIN ECKART.